US010716012B2

(12) United States Patent
Sen et al.

(10) Patent No.: US 10,716,012 B2
(45) Date of Patent: *Jul. 14, 2020

(54) BEAMFORMING TO A HARVESTING DEVICE

(71) Applicant: HEWLETT-PACKARD DEVELOPMENT COMPANY, L.P., Houston, TX (US)

(72) Inventors: Souvik Sen, Palo Alto, CA (US); David Lee, Palo Alto, CA (US); Martin R Fink, Palo Alto, CA (US); Kyu-Han Kim, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/535,863

(22) PCT Filed: Jan. 8, 2015

(86) PCT No.: PCT/US2015/010563
§ 371 (c)(1),
(2) Date: Jun. 14, 2017

(87) PCT Pub. No.: WO2016/111687
PCT Pub. Date: Jul. 14, 2016

(65) Prior Publication Data
US 2017/0353869 A1 Dec. 7, 2017

(51) Int. Cl.
H04W 16/28 (2009.01)
H04W 40/02 (2009.01)
(Continued)

(52) U.S. Cl.
CPC .............. *H04W 16/28* (2013.01); *H02J 50/80* (2016.02); *H04W 40/02* (2013.01); *H04W 84/12* (2013.01)

(58) Field of Classification Search
None
See application file for complete search history.

(56) References Cited

U.S. PATENT DOCUMENTS

2007/0109121 A1* 5/2007 Cohen .............. G06K 19/07767
340/539.26
2008/0309452 A1 12/2008 Zeine
(Continued)

FOREIGN PATENT DOCUMENTS

WO WO-2013127427 A1 9/2013

OTHER PUBLICATIONS

Ju, H. et al, "A Novel Mode Switching Scheme Utilizing Random Beamforming for Opportunistic Energy Harvesting", Jul. 21, 2014.
(Continued)

*Primary Examiner* — Gregory B Sefcheck
*Assistant Examiner* — Amarnauth G Persaud
(74) *Attorney, Agent, or Firm* — HPI Patent Department

(57) ABSTRACT

Described herein are techniques for beamforming a wireless signal to a harvesting device. In an example, a method to increase available energy to a harvesting device is performed by a WiFi transmitting device. The WiFi transmitting device determines a preferred wireless path to the harvesting device using input from a proxy device. The WiFi transmitting device then beamforms a WiFi signal to the harvesting device along the preferred wireless path.

15 Claims, 3 Drawing Sheets

(51) Int. Cl.
*H02J 50/80* (2016.01)
*H04W 84/12* (2009.01)

(56) References Cited

U.S. PATENT DOCUMENTS

| | | | |
|---|---|---|---|
| 2011/0175461 A1* | 7/2011 | Tinaphong | H02J 7/025 307/149 |
| 2012/0069827 A1* | 3/2012 | Lee | H04W 52/0274 370/338 |
| 2012/0274154 A1 | 11/2012 | Deluca | |
| 2013/0137455 A1 | 5/2013 | Xia et al. | |
| 2013/0265140 A1 | 10/2013 | Gudan et al. | |
| 2013/0300541 A1* | 11/2013 | Pesonen | G01S 5/0289 340/10.1 |
| 2014/0011543 A1 | 1/2014 | Li et al. | |
| 2014/0018110 A1* | 1/2014 | Yoakum | H04W 4/02 455/456.5 |
| 2014/0111032 A1* | 4/2014 | Shearer | G06K 19/0707 307/149 |
| 2014/0203758 A1 | 7/2014 | Moshfeghi | |
| 2014/0312242 A1* | 10/2014 | Valentino | G01P 13/00 250/395 |
| 2015/0094098 A1* | 4/2015 | Stern | H04W 4/029 455/456.3 |
| 2015/0128733 A1* | 5/2015 | Taylor | H02J 50/001 73/865.8 |
| 2015/0256097 A1* | 9/2015 | Gudan | H02J 50/001 363/125 |
| 2015/0271673 A1* | 9/2015 | Lord | H02J 50/80 455/411 |
| 2015/0303741 A1* | 10/2015 | Malik | H04B 5/0037 307/104 |
| 2016/0049824 A1* | 2/2016 | Stein | H04W 4/70 320/108 |
| 2017/0300098 A1* | 10/2017 | Sen | G06F 1/266 |

OTHER PUBLICATIONS

Khandake, MRA et al, "Robust Secrecy Beamforming with Energy-Harvesting Eavesdroppers", Oct. 15, 2014.

Vyas, R. et al, "A Battery-Less Energy Harvesting Device for Long Range Scavenging of Wireless Power from Terrestrial TV Broadcasts", Feb. 28, 2012.

Xiao, Lu et al, "Wireless Networks with RF Energy Harvesting: A Contemporary Survey", Cornell University, Sep. 5, 2014.

Xu, J et al, "Multiuser Miso Beam Forming for Simultaneous Wireless Information and Power Transfer", Sep. 15, 2014.

Xiao Lu et al: "Wireless Networks With RF Energy Harvesting: A Contemporary Survey", arxiv.org, vol. arXiv:14, Sep. 5, 2014 (Sep. 5, 2014) pp. 1-34.

* cited by examiner

BEAMFORMING TO A HARVESTING DEVICE

BACKGROUND

Wireless energy harvesting technology can be used to harvest energy from a radio frequency signal, such as an IEEE 802.11 WiFi signal. This harvested energy can be stored in a battery and can be used to power a device. However, it can be challenging to harvest enough energy from such a signal to fully power a device.

BRIEF DESCRIPTION OF DRAWINGS

The following detailed description refers to the drawings, wherein.

DETAILED DESCRIPTION

According to an example, a computing device with a wireless (e.g., IEEE 802.11 WiFi) signal transmitting capability, such as a wireless access point, may execute a method to increase available energy to a harvesting device. Available energy may be increased by concentrating the WiFi signal in the direction of the harvesting device through a beamforming technique. Beamforming (also referred to as spatial filtering) is a signal processing technique for directional signal transmission or reception, such that a signal may be directed/concentrated in a particular direction to increase the strength of the signal in that direction.

Beamforming generally requires input/feedback from a receiving device in order for the transmitting device to determine the most appropriate wireless path for the signal. However, the harvesting device may be a device with a WiFi receiving capability but without a WiFi transmitting capability. For example, the harvesting device may be an Internet of Things device with a harvester and a WiFi receiver. Due to this lack of transmitting capability, the harvesting device may be unable to provide input/feedback to the access point regarding a preferred wireless path (e.g., direction) to be used for beamforming.

To overcome this problem, the access point may determine a preferred wireless path to the harvesting device using input from a proxy device. The proxy device may be a device configured to interact with the harvesting device. For example, the proxy device may be a smartphone configured to communicate with the harvesting device via a form of short-distance communication, such as Bluetooth®. When the proxy device interacts with the harvesting device, the proxy device may provide input to the access point. Because the short-distance communication method implies that the proxy device is within a particular distance of the harvesting device, input from the proxy device may be used as proxy information for the approximate location of and preferred wireless path to the harvesting device. The access point may thus use this input from the proxy device to determine a preferred wireless path to the harvesting device. The access point may then beamform a WiFi signal to the harvesting device along the preferred wireless path.

As a result, the available energy to be harvested by the harvesting device may be increased since the beamforming of the WiFi signal increases the signal's strength in the vicinity of the harvesting device. Additional examples, advantages, features, modifications and the like are described below with reference to the drawings.

Figure 1A:
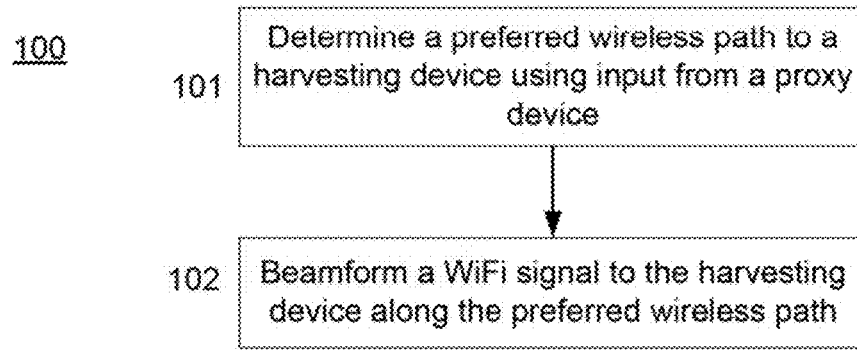
FIG. 1a illustrates a method to beamform to a harvesting device, according to an example.
Figure 1B:
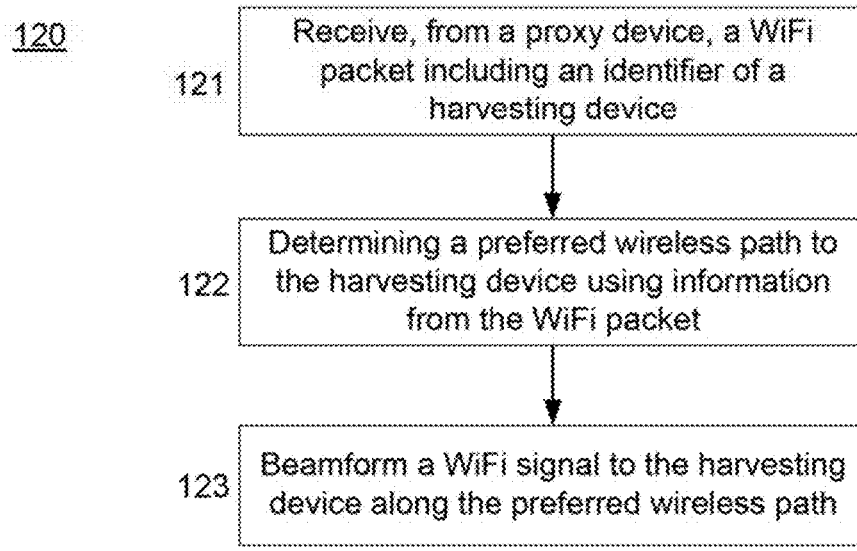
FIG. 1b illustrates another method to beamform a harvesting device, according to an example.

FIGS. 1a and 1b illustrate methods to beamform to a harvesting device, according to an example. Methods 100 and 120 may be performed by a computing device or computer, such as wireless access point 210 and computer 310. Computer-readable instructions for implementing methods 100 and 120 may be stored on a computer readable storage medium. These instructions as stored on the medium are referred to herein as "modules" and may be executed by a computer.

Figure 2:
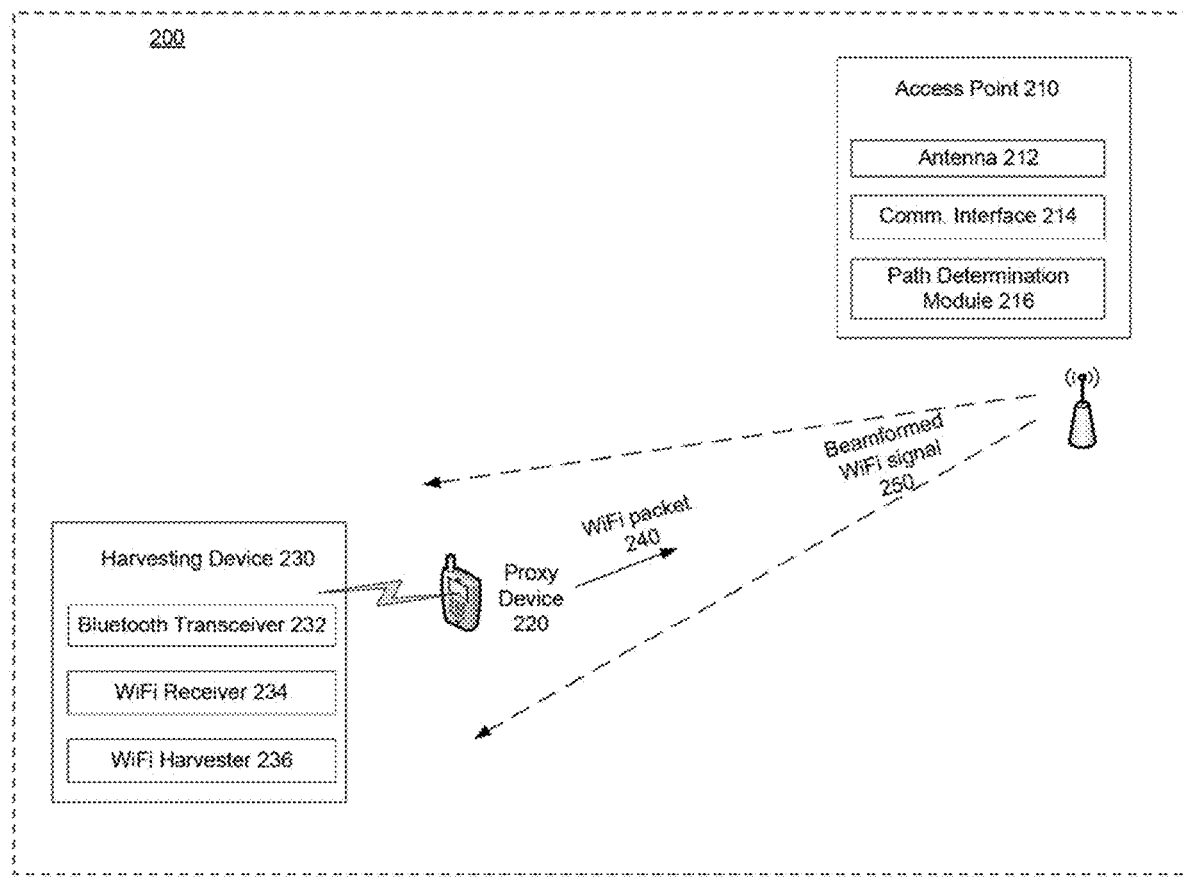
FIG. 2 illustrates an access point to beamform to a harvesting device, according to an example.

Methods 100 and 120 will be described here relative to environment 200 of FIG. 2. Environment 200 may include a wireless access point 210, a proxy device 220, and harvesting device 230. Environment 200 may be an indoor area, such as a home, office, store, etc., or an outdoor area, such as a park, city block, etc.

Proxy device 220 may be any of various computing devices, such as a mobile phone, smartphone, tablet computer, laptop computer, desktop or workstation computer, or the like, and may include wireless communication capability, such as through a wireless card. In particular, proxy device 220 may be capable of communicating with access point 210 via IEEE 802.11 WiFi technology. Proxy device 220 may also include a short-distance wireless communication capability, such as Bluetooth® or Near Field Communication (NFC), for communicating with harvesting device 230.

Access point 210 is a WiFi transmitting device, and may specifically be a wireless access point that provides wireless network access to devices. Access point 210 may implement known wireless networking protocols, such as IEEE 802.11 variations. Access point 210 may include an antenna 212 for transmitting and receiving signals. Access point 210 may also include a communication interface 214 to send and receive data (e.g., packets) via antenna 212. Access point 210 may also include a path determination module 216 for determining a wireless path for beamforming. Access point 210 may thus be configured to perform beamforming techniques as known by those of ordinary skill in the art. Accordingly, access point 210 may determine a preferred wireless path and may use beamforming techniques to beamform a wireless signal along the preferred wireless path. In other examples, access point 210 may instead be a different type of computing device with a WiFi transmitting capability, such as a desktop computer, laptop computer, or the like, having a wireless card and antenna.

Harvesting device 230 may be a computing device, such as an Internet of Things (IoT) device. In general, an IoT device may be an embedded computing device capable of connecting to the Internet or to another computing device (e.g., smartphone) in order to share information. The IoT device may be embedded in or be part of, for example, a thermostat, a refrigerator, a washing machine, an HVAC system, a television, or the like. The IoT device also may be simply a sensor or collection of sensors. Alternatively, harvesting device 230 may be another form of computing device, such as a peripheral device (e.g., wireless mouse, wireless keyboard, etc.). Furthermore, harvesting device 230 may be capable of harvesting energy from a wireless signal, such as an IEEE 802.11 WiFi signal. Harvesting device 230 may be capable of powering itself solely through harvested energy.

In particular, harvesting device 230 may include a Bluetooth transceiver 232 for sending and receiving a Bluetooth signal. Harvesting device 230 may be capable of communicating with proxy device 220 via the Bluetooth transceiver. Alternatively, harvesting device 230 may include a different short-distance communication technology. Harvesting device 230 may also include a WiFi receiver 234 for receiving a WiFi signal. Harvesting device 230 may lack a WiFi transceiver, thus making it incapable of providing input/feedback to access point 210 via WiFi. Harvesting device 230 may include a WiFi harvester 236 for harvesting energy from the received WiFi signal. The WiFi harvester may include harvesting circuitry, such as a rectifying circuit to produce a direct current voltage from analog power derived from a received WiFi signal, and a power management circuit to provide a regulated voltage to a load to thus power the harvesting device 230. Additional details on harvesting devices and related harvesting technology are described in the related PCT Application entitled "Supplying Power to a Computer Accessory from a Captured WiFi Signal", filed on the same day as this patent application and associated with PCT/US15/10561, which application is herein incorporated by reference in its entirety.

Access point 210, proxy device 220, and harvesting device 230 may include one or more controllers and one or more machine-readable storage media. A controller may include a processor and a memory for implementing machine readable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

The controller may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, access point 210, proxy device 220, and harvesting device 230 may include one or more machine-readable storage media separate from the one or more controllers.

Turning to FIG. 1a, method 100 may be used to beamform a wireless signal to a harvesting device, according to an example. For illustration, method 100 will be described as executed by access point 210. The harvesting device may be harvesting device 230, configured to harvest radio frequency (RF) energy.

As described previously, an RF energy harvester includes an antenna and harvesting circuitry. Efficiency of a harvesting circuit is defined as the percentage of the received wireless power that the circuit can convert to DC power. The total energy that can be harvested depends on the amount of incident wireless energy from a wireless transmitter. If a wireless source is transmitting with a power of $P_t$ watts at a distance of R meters from the harvester's antenna, the total received power ($P_r$) at the antenna is:

$$P_r = P_t G_t G_r (\lambda/4\pi R)^2$$

where $G_t$ and $G_r$ are antenna gains of the transmitter and the harvester's antenna respectively and $\lambda$ is the wavelength of the RF signal at 2.4 GHz, which is approximately 0.125 meters. Most RF sources such as WiFi and Bluetooth have a total transmit power, including antenna gain, of 200 mW. Therefore, if the RF source is at a distance of 20 meters, one may be able to harvest −17 dBm (0.02 mW) of power, which may be enough to drive low power sensors and RFID tags. On the other hand, if the RE source is nearby, one may be able to harvest more than 0 dBm (1 mW) of power.

More particularly, the amount of energy that can be harvested depends on received energy at the harvester. This in turn depends on the transmit power of the source (the transmitter). It may not be possible to increase the source's transmit power because the source may have restrictions regarding the amount of transmit power it can utilize. Furthermore, Federal Communication Commission (FCC) regulations limit the amount of transmit power in the 2.4 GHz band to 4 W equivalent isotropically radiated power (EIRP).

Another way to increase the received energy at the harvester is to use beamforming techniques at the transmitter. In general only a small fraction of the transmit power of the wireless source is available to the harvesting antenna. This happens because wireless signals travel in all directions from the source, dissipating the energy as it travels through the air. Beamforming is a method of transmission that focuses energy in one direction. Provided the transmitter has sufficient information to know which direction to send the radio energy in, it is possible for the wireless signal to reach farther and to be stronger, thus increasing the received energy at the harvester.

The gain in received energy due to beamforming can also depend on the number of antennas present at the transmitter. With three antennas, the signal strength at the receiver can be improved by 3 dB (2 times) on average. However, to beamform correctly, usually the transmitter needs feedback from the receiver. Depending on the beamforming mechanism, the feedback is either used to derive the direction of the receiver with respect to the transmitter or to calculate all the propagation paths between the transmitter and the receiver. Including such a feedback mechanism may not be practical because, when the transmitter is capable of WiFi communication only, the harvesting device must also include a wireless transmitting capability. However, since a wireless transmitter/transceiver consumes a significant amount of energy, unless the beamforming gain is high due to numerous antennas at the transmitter, the transmitter/transceiver may often consume more energy than that harvested by the harvester. Using the techniques described herein, such as in methods 100 and 120, feedback may be provided to the transmitter to enable beamforming without requiring a WiFi transmitting capability in the harvesting device.

Method 100 may begin at 101, where a preferred wireless path to the harvesting device 230 may be determined using input from proxy device 220. The preferred wireless path may be determine over time and/or updated based on multiple inputs from proxy device 220. Since the input of the proxy device 220 is used as a proxy for input/feedback from the harvesting device 230, preferably the input from proxy device 220 is received when proxy device 220 is no more than one meter away from harvesting device 230. This may be consistent with many short-distance communication technologies.

The input from proxy device 220 may include an identifier identifying harvesting device 230. Using this identifier, access point 210 may know that the input is relevant to providing a beamformed signal to harvesting device 230 (as opposed to being simply a typical WiFi packet from proxy device). Additionally, it may be possible that there are multiple harvesting devices in the environment 200, and thus access point 210 may build a table containing information relevant to beamforming toward each of the harvesting devices. In one example, access point 210 may beamform toward one or more harvesting devices according to a schedule.

The preferred wireless path may simply be a direction in which the WiFi signal should be directed. The preferred wireless path may also be a particular wireless propagation path or paths between the access point 210 and the harvesting device 230, often referred to as wireless channel characteristics.

More specifically, for a beamforming technique using one or more steerable directional antennas, the preferred wireless path may be determined simply by knowing the direction of the harvesting device 230 with respect to access point 210. This direction may be preset in access point 230, such as via a user interface in proxy device 220. Alternatively, the direction may be determined by estimating a location of proxy device 220 when it is in communication with harvesting device 230. This location may be determined by access point 210 and neighboring access points by virtue of received WiFi packets 240 using location determination techniques, such as a location determination technique based on time-of-flight measurements. The location of proxy device 220 may be used as a proxy for the location of harvesting device 230.

If a digital beamforming technique is used, the preferred wireless path may be based on one or more wireless propagation paths determined based on wireless channel characteristics. To obtain the wireless channel characteristics, access point 210 may use the wireless response characteristics of proxy device 220 as a proxy for the wireless response characteristics of harvesting device 230. Thus, access point 210 may determine wireless channel characteristics based on WiFi packets 240 received from proxy device 220. In some cases, a preferred wireless path determined based on such characteristics may be more accurate than a wireless path determined based on simply a direction of harvesting device, as an optimal wireless path may not always be in the exact direction of the harvesting device relative to the transmitting device.

At 102, a WiFi signal may be beamformed to the harvesting device along the preferred wireless path. In particular, for example, access point 210 may provide a beamformed WiFi signal 250 to harvesting device 230 along the determined preferred wireless path. In an example, access point 210 may beamform the WiFi signal 250 to harvesting device 230 in a broadcast manner, such as when access point 210 is not participating in unicast communication with other client devices. As a result of method 100, the strength of the WiFi signal may be increased at harvesting device 230, which increases the available energy to be harvested.

FIG. 1b illustrates another method 120 that may be used to beamform a wireless signal to a harvesting device, according to an example. For illustration purposes, method 120 will be described as executed by access point 210 in environment 200. At 121, access point 210 receives a WiFi packet 240 from proxy device 220. The WiFi packet 240 includes an identifier that identifies harvesting device 230. At 122, access point 210 determines a preferred wireless path to harvesting device 230 using information from the WiFi packet 240. At 123, access point 210 beamforms a WiFi signal 250 to the harvesting device 230 along the preferred wireless path.

Figure 3:
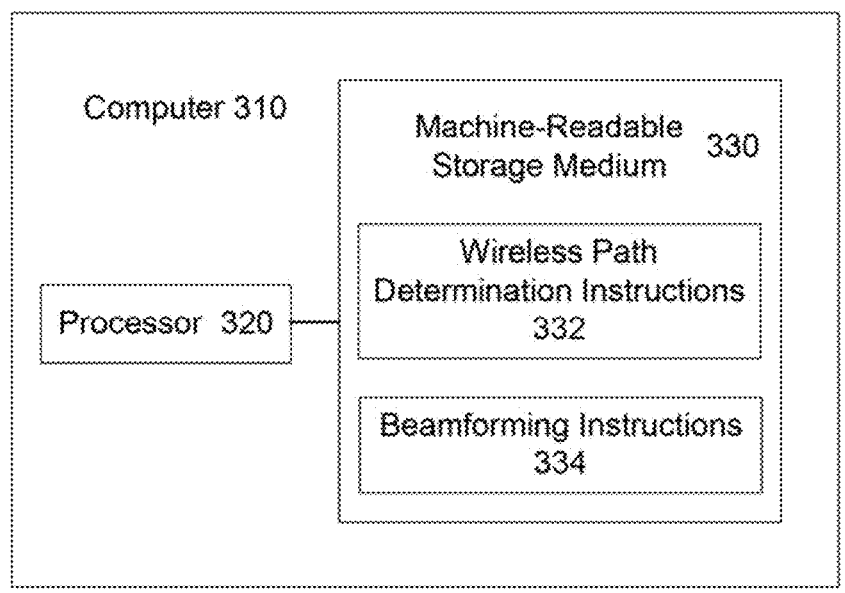
FIG. 3 illustrates a computer-readable medium to beamform to a harvesting device, according to an example.

FIG. 3 illustrates a computer-readable medium to beamform a wireless signal to a harvesting device, according to an example. Computer 310 may be part of access point 210. The computer may include one or more controllers and one or more machine-readable storage media, as described with respect to access point 210, for example.

Processor 320 may be at least one central processing unit (CPU), at least one semiconductor-based microprocessor, other hardware devices or processing elements suitable to retrieve and execute instructions stored in machine-readable storage medium 330, or combinations thereof. Processor 320 can include single or multiple cores on a chip, multiple cores across multiple chips, multiple cores across multiple devices, or combinations thereof. Processor 320 may fetch, decode, and execute instructions 332-334 among others, to implement various processing. As an alternative or in addition to retrieving and executing instructions, processor 320 may include at least one integrated circuit (IC), other control logic, other electronic circuits, or combinations thereof that include a number of electronic components for performing the functionality of instructions 332-334. Accordingly, processor 320 may be implemented across multiple processing units and instructions 332-334 may be implemented by different processing units in different areas of computer 310.

Machine-readable storage medium 330 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 330 can be computer-readable and non-transitory. Machine-readable storage medium 330 may be encoded with a series of executable instructions for managing processing elements.

The instructions 332-334 when executed by processor 320 (e.g., via one processing element or multiple processing elements of the processor) can cause processor 320 to perform processes, for example, methods 100 and 120, and/or variations and portions thereof. Instructions 332-334 will now be briefly described, which description should be read in light of the description of methods 100, 120, and access point 210 above.

For example, wireless path determination instructions 332 may cause processor 320 to determine a preferred wireless path to a harvesting device using input from a separate device. The harvesting device may be a device with a wireless energy harvesting capability, such as harvesting device 230. The separate device may be a computing device configured to communicate with the harvesting device, such as proxy device 220. Beamforming instructions 334 may cause processor 320 to beamform a wireless signal to the harvesting device along the preferred wireless path. As a result, available energy to be harvested may be increased at the harvesting device.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method to increase available energy to a harvesting device, comprising, by a WiFi transmitting device:
   associating the harvesting device with a proxy device based on an interaction of the proxy device with the harvesting device occurring via a short-distance communication link between the harvesting device with a proxy device, wherein the short-distance communication link includes Bluetooth or near-field communication (NFC), wherein the harvesting device lacks a WiFi transmitter, wherein the interaction indicates that the proxy device is within a particular distance of the harvesting device, the particular distance being effective for beamforming signal strength at the harvesting device;
   receiving a WiFi packet from the proxy device, the WiFi packet indicating that beamforming is to be provided to the harvesting device;
   determining a location of the proxy device;
   using the location of the proxy device as the location of the harvesting device;
   determining a preferred wireless path from the WiFi transmitting device to the harvesting device based on the location of the harvesting device; and
   beamforming a WiFi signal from the WiFi transmitting device to the harvesting device along the preferred wireless path.

2. The method of claim 1, wherein the harvesting device is an Internet of Things device with a WiFi energy harvesting capability.

3. The method of claim 1, wherein the harvesting device is a peripheral device with a WiFi energy harvesting capability.

4. The method of claim 1, wherein the WiFi packet includes an identifier of the harvesting device.

5. The method of claim 1, wherein the proxy device sends the WiFi packet to the WiFi transmitting device after beginning communication with the harvesting device.

6. The method of claim 1, wherein information in the WiFi packet is used to determine the preferred wireless path to the harvesting device.

7. The method of claim 1, wherein the harvesting device is configured to communicate with the proxy device.

8. The method of claim 7, wherein the harvesting device is configured to communicate with the proxy device via Bluetooth wireless technology.

9. The method of claim 1, wherein the WiFi transmitting device is configured to beamform the WiFi signal to the harvesting device in a broadcast manner.

10. The method of claim 1, wherein the WiFi transmitting device is configured to beamform the WiFi signal to the harvesting device only when it is not participating in unicast communication with other client devices.

11. The method of claim 1, comprising determining the preferred wireless path to the harvesting device when the proxy device is no more than one meter away from harvesting device.

12. A wireless access point, comprising:
   a communication interface to receive a packet from a first device, the packet including an identifier of a second device having a wireless harvesting functionality, wherein the first device is associated with the second device based on an interaction of the first device with the second device occurring via Bluetooth or near-field communication (NFC), and wherein the first device is to indicate a location of the second device, wherein the interaction indicates that the first device is within a particular distance of the second device such that a location of the first device is taken as a location of the second device, the particular distance being effective for beamforming signal strength at the second device;
   a path determination module to determine a wireless path to the second device based on the location of the second device and information from the packet; and
   an antenna,
   the wireless access point to receive a WiFi packet from the first device, the WiFi packet indicating that beamforming is to be provided to the second device; and
   the wireless access point to beamform, via the antenna, a WiFi signal to the second device along the wireless path.

13. The wireless access point of claim 12, wherein:
   the second device is not capable of communicating with the wireless access point, and
   the second device is capable of communicating with the first device.

14. The wireless access point of claim 12, wherein the second device comprises a harvesting circuit to harvest energy from a received WiFi signal.

15. A non-transitory computer-readable storage medium storing instructions that, when executed by a processor, cause the processor to:
   associate a harvesting device with a separate device based on an interaction of the separate device with the harvesting device occurring within a particular distance provided by a short-distance communication link that includes Bluetooth or near-field communication (NFC) between the separate device and the harvesting device, wherein a location of the separate device is to indicate a location of the harvesting device based on the interaction indicating that the separate device is within a particular distance of the harvesting device, the particular distance being effective for beamforming signal strength at the harvesting device, and wherein the harvesting device lacks a WiFi transmitter;
   determine, at an access point, a preferred wireless path to the harvesting device based on input from the separate device and the location of the harvesting device;
   receive a WiFi packet from the separate device, the WiFi packet indicating that beamforming is to be provided to the harvesting device; and
   beamform a wireless signal to the harvesting device along the preferred wireless path.

* * * * *